United States Patent
Green et al.

(10) Patent No.: US 9,900,392 B2
(45) Date of Patent: Feb. 20, 2018

(54) IDENTIFYING GROUPS FOR RECOMMENDATION TO A SOCIAL NETWORKING SYSTEM USER BASED ON USER LOCATION AND LOCATIONS ASSOCIATED WITH GROUPS

(71) Applicant: Facebook, Inc., Menlo Park, CA (US)

(72) Inventors: Bradley Ray Green, Snohomish, WA (US); Li Ju, Issaquah, WA (US); Jireh Yiwei Tan, San Francisco, CA (US); Chen Wang, Redmond, WA (US); Yi Miao, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 209 days.

(21) Appl. No.: 14/750,509

(22) Filed: Jun. 25, 2015

(65) Prior Publication Data

US 2016/0378776 A1    Dec. 29, 2016

(51) Int. Cl.
| | |
|---|---|
| *G06F 7/00* | (2006.01) |
| *G06F 17/30* | (2006.01) |
| *H04L 29/08* | (2006.01) |
| *G06Q 50/00* | (2012.01) |

(52) U.S. Cl.
CPC .......... *H04L 67/18* (2013.01); *G06F 17/3087* (2013.01); *G06Q 50/01* (2013.01)

(58) Field of Classification Search
CPC ............... G06Q 50/01; G06F 17/30861
See application file for complete search history.

(56) References Cited

U.S. PATENT DOCUMENTS

| | | | | |
|---|---|---|---|---|
| 2008/0114737 A1* | 5/2008 | Neely | ............. | G06Q 10/107 |
| 2012/0046995 A1* | 2/2012 | Petersen | ............. | G06Q 30/0204 |
| | | | | 705/7.33 |
| 2013/0332447 A1* | 12/2013 | Bernier | ............. | G06F 17/30241 |
| | | | | 707/713 |
| 2014/0074650 A1* | 3/2014 | Elias | ............. | G06F 17/30867 |
| | | | | 705/26.7 |
| 2014/0365484 A1* | 12/2014 | Freeman | ............. | G06Q 50/01 |
| | | | | 707/736 |

* cited by examiner

*Primary Examiner* — Charles Lu
(74) *Attorney, Agent, or Firm* — Fenwick & West LLP (57) ABSTRACT

A social networking system selects a set of groups for presentation to a user of the social networking system. To select groups, the social networking system identifies candidate groups and selects the set of groups from the candidate groups. To identify certain candidate groups, the social networking system determines a location associated with various groups based on locations associated with users included in the group. For example, the social networking system determines a centroid of a group based on locations associated with users included in the group and associates the centroid with the group if at least a threshold percentage of distances between locations associated with users included in the group and the centroid do not exceed a threshold distance. Groups associated with locations within a threshold distance of a location associated with the user are identified as candidate groups.

16 Claims, 3 Drawing Sheets

IDENTIFYING GROUPS FOR RECOMMENDATION TO A SOCIAL NETWORKING SYSTEM USER BASED ON USER LOCATION AND LOCATIONS ASSOCIATED WITH GROUPS

BACKGROUND

This disclosure relates generally to social networking systems, and more specifically to identifying groups of users to a social networking system user.

An online system, such as a social networking system, allows its users to connect to and communicate with other online system users. Users may create profiles on an online system that are tied to their identities and include information about the users, such as interests and demographic information. The users may be individuals or entities such as corporations or charities.

Additionally, a social networking system may maintain groups of users, allowing a user to provide content to a group for presentation to each user included in the group. A group may be associated with a topic, a location, or with any other suitable characteristic, so a user included in the group may more easily view or share content associated with the characteristic associated with the group. However, as a social networking system may maintain a large number of groups, a user may expend significant time identifying groups associated with characteristics of interest to the user. This decreases the likelihood of the user identifying groups of interest to the user, which may decrease the amount of interaction between the user and the social networking system.

SUMMARY

Users of a social networking system communicate messages or other content to each other via the social networking system. To simplify communication of content, the social networking system may maintain various groups each including one or more users of the social networking system. A user may communicate content to a group, which causes the social networking system to present the content to the users included in the group. A user may provide content to a group including the user for distribution to other users in the group or may view or otherwise access content associated with the including the user.

To allow a user to more easily identify a group of interest to the user, the social networking system identifies candidate groups for recommendation to the user based on a location associated with the user by the social networking system and locations associated with various groups maintained by the social networking system. The social networking system associates one or more locations with each user. For example, the user specifies the user's hometown or residence location to the social networking system, which stores the specified location in association with the user. Alternatively or additionally, the social networking system associates a current location with the user, which may be determined by analyzing content provided to the social networking system by the user or actions associated with the user by the social networking system. In some embodiments, a user may authorize a client device associated with the user to communicate a location of the client device to the social networking system at periodic intervals or when certain conditions are satisfied; the social networking system then stores the location from the client device in association with the user.

Based on locations associated with users included in each group, the social networking system determines a location associated with each group. In one embodiment, the social networking system identifies locations associated with various users in a group and determines a location associated with the group based at least in part on a centroid of the locations associated with the various users in the group. For example, the social networking system determines a centroid of the locations associated with each user in the group and determines a distance between locations associated with users in the group and the centroid. If at least a threshold percentage of the determined distances are less than a threshold distance, the social networking system determines the centroid is the location associated with the group. For example, the social networking system generates a histogram of the distances between locations associated with users in the group and the centroid. If a specified percentile of the distances between locations associated with users in the group and the centroid is less than or equal to the threshold distance, the social networking system determines the location associated with the group as the centroid.

When the user requests the social networking system identify one or more groups, the social networking system determines one or more candidate groups based at least in part on the location associated with the user and locations associated with various groups. The social networking system determines groups associated with locations within a threshold distance of the location associated with the user are candidate groups. In some embodiments, the social networking system identifies various geographic regions that each include locations within a specific geographic area and identifies a geographic region including the location associated with the user. Groups associated with locations within the geographic region including the location associated with the user are determined to be candidate groups. In some embodiments, the social networking system selects groups associated with locations within the geographic region including the location associated with the user and satisfying at least a threshold number of criteria as candidate groups. For example, the social networking system determines a group associated with a location within the geographic region including the location associated with the user had having less than a threshold percentage of users in the group identifying a common employer as a candidate group but does not determine another group associated with a location within the geographic region including the location associated with the user and having greater than the threshold percentage of users in the other group identifying the common employer as a candidate group.

To more accurately determine candidate groups the social networking system may modify one or more dimensions of the geographic region including the location associated with the user based on a density of groups associated with locations within the geographic region or a number of groups associated with locations within the geographic region. In one embodiment, the social networking system determines a density of groups associated with locations within the geographic region as a ratio of a number of groups associated with locations within the geographic region to an area of the geographic region. If the density of groups associated with locations within the geographic region exceeds a threshold value, the social networking system modifies one or more dimensions of the geographic region to reduce the area of the geographic region, so the modified geographic region has a lower density of groups associated with locations within the modified geographic region. In some embodiments, the social networking system modifies one or more dimensions (e.g., reduces one or more dimensions) of the geographic region in response to a number of groups associated with locations within the geographic region exceeding a threshold number.

The social networking system includes the candidate groups in one or more selection processes that identify a set of groups for identification to the user. In various embodiments, the selection processes include the candidate groups and other groups identified by the social networking system. Based on characteristics of the candidate groups, the selections processes identify a set of users, and the social networking system communicates information identifying the set of users to a client device for presentation to the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
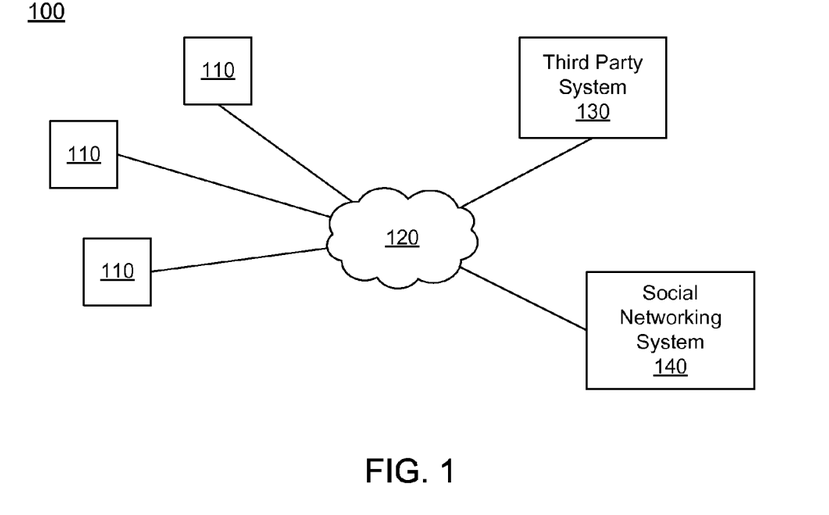
FIG. 1 is a block diagram of a system environment in which a social networking system operates, in accordance with an embodiment.

FIG. 1 is a block diagram of a system environment 100 for a social networking system 140, such as a social networking system. The system environment 100 shown by FIG. 1 comprises one or more client devices 110, a network 120, one or more third-party systems 130, one or more machines 135, and the social networking system 140. In alternative configurations, different and/or additional components may be included in the system environment 100. The embodiments described herein may be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
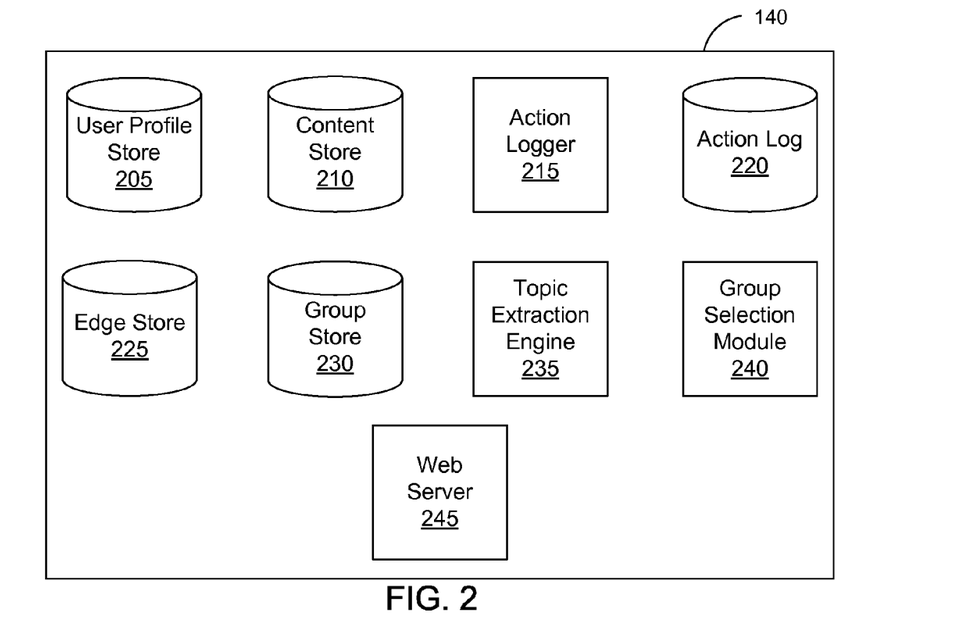
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a group store 230, a topic extraction engine 235, a group selection module 240 and a web server 245. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." A content identifier is associated with each content item to allow the social networking system 140 to more easily identify and retrieve various content items. Hence, online system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. An edge between a user and another user may be associated with a connection strength specified by the user and providing information about a relationship between the user and the other user. For example, connections between a user and other users with which the user has a close relationship, such as family members, have relatively high connection strengths, while connections between the user and additional users with which the user has a more distant relationship have lower connection strengths. In some embodiments, a user selects from connection strengths associated with different types of relationships (e.g., family members, co-workers, friends, partners, etc.) when specifying a connection with another user, and the edge store 225 associates a selected connection strength with an edge describing the connection. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate a user's interest in an object, a topic, or another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The group store 230 includes information identifying various groups of users. A group is associated with a group identifier stored by the group store 230 that uniquely identifies the group. One or more identifiers associated with users are associated with the group identifier to identify users of social networking system 140 included in the group. Other information may be associated with a group identifier, such as a name identifying a group corresponding to the group identifier, a description associated with the group, descriptive information associated with the group (e.g., a location), or other suitable information. Additionally, one or more content identifiers specifying content items are associated with a group identifier to identify content items associated with a group associated with the group identifier. If a content item, such as a message, is communicated to a group, the message is communicated to users associated with the group. Hence, maintaining a group allows content to be more easily communicated to users within the group by allowing content to be communicated to the group rather than communicated to various individual users. A group may be generated by a user of the social networking system 140 identifying users associated with the group or the social networking system 140 may generate one or more groups based on characteristics associated with users of the social networking system 140. Additionally, a user's interactions with a group are identified in the action log 220 or in the group store 230 by associating a group identifier with information describing an interaction with the group.

The social networking system 140 includes a topic extraction engine 235, which identifies one or more topics associated with objects in the content store 210 or with groups in the group store 230. To identify topics associated with content items, the topic extraction engine 235 identifies anchor terms included in a content item and determines a meaning of the anchor terms as further described in U.S. application Ser. No. 13/167,701, filed Jun. 24, 2011, which is hereby incorporated by reference in its entirety. For example, the topic extraction engine 235 determines one or more topics associated with a content item maintained in the content store 210. The one or more topics associated with a content item are stored and associated with an object identifier corresponding to the content item. In various embodiments, associations between object identifiers and topics are stored in the topic extraction engine 240 or in the content store 210 to simplify retrieval of one or more topics associated with an object identifier or retrieval of object identifiers associated with a specified topic. Structured information associated with a content item may also be used to extract a topic associated with the content item.

To identify topics associated with a group, the topic extraction engine 235 identifies content items associated with the group based on information included in the group store 230 and determines topics associated content items associated with the group based on anchor terms included in the content items as described above. In one embodiment, the topic extraction engine 235 associates topics with a group that are associated with at least a threshold number or threshold percentage of content items associated with the group. Alternatively, the topic extraction engine ranks topics based on a frequency with which the topics are associated with content items associated with a group and associates topics having at least a threshold position in the ranking with the group. Topics associated with a group may be stored in the group store 230 along with the group's group identifier.

The group selection module 240 identifies one or more groups having at least a threshold likelihood of being relevant to a user, allowing the user to more easily identify groups associated with content with which the user is likely to interact or groups including users with which the user is likely to interact of interest. In various embodiments, the group selection module 240 identifies candidate groups for a user having characteristics satisfying one or more criteria and includes the candidate groups in one or more selection processes that select a set of groups to identify to the user, as further described below. For example, the group selection module 240 determines locations associated with various groups based on locations associated with users included in the groups and identifies candidate groups as groups associated with locations within a threshold distance of a location associated with the user. Selection of candidate groups based on locations associated with groups is further described below in conjunction with FIG. 4.

Identifying groups for a user allows the social networking system 140 to encourage the user to interact with a broader range of content items or users, which increases the amount of interaction between the user and the social networking system 140. In one embodiment, the group selection module 240 determines a score for various groups, where a score for a group is based on a model determining a likelihood of the user interacting with the group within a specified time interval. A score for a group is based on a model determining a likelihood of the user interacting with the group within a specified time interval. Various interactions between the user and other groups maintained by the social networking system are used to determine the score for a group. For example, the user's interactions with groups having at least a threshold number of characteristics matching or similar to a group are used to determine the score for the group. Examples of interactions used to determine the score for a group include the user providing one or more content items to an additional group with similar characteristics to the group for presentation to users associated with the additional group, the user commenting on content items associated with an additional group with similar characteristics to the group, the user sharing content items associated with an additional group having similar characteristics to the group, and the user indicating a preference for a content item associated with an additional group having similar characteristics to the group.

Additionally, the score associated with the group is based in part on interactions where the user accessed content items associated with one or more groups having similar characteristics to the group. For example, if the user views a content item associated with an additional group having similar characteristics to the group for at least a threshold length of time, the social networking system identifies an interaction where the user has viewed the content item. A frequency with which the user views content items associated with groups having similar characteristics to the group or a number of times the user views content items associated with groups having similar characteristics to the group is used when determining the score for the group. Accounting for interactions where the user provides content to groups as well as interactions where the user passively views content associated with groups increases the likelihood of the group selection module 240 identifying a group with which the user is likely to interact by accounting for a broader range of interactions when determining scores for groups.

Based on the scores associated with various groups, the group selection module 240 selects one or more groups for identification to the user. For example, the group selection module 240 ranks groups based on their associated scores and selects one or more groups having at least a threshold position in the ranking. Alternatively, the group selection module 240 selects one or more groups associated with at least a threshold score. Information describing the selected groups is communicated from the social networking system 140 to a client device 110 associated with the user. The information may be presented in an order based at least in part on the scores associated with selected groups to allow the user to more easily identify selected groups with higher scores, which increases the likelihood of the user identifying a group with which the user will subsequently interact.

In some embodiments, the group selection module 240 applies one or more rules when selecting groups to select groups satisfying different criteria. For example, the group selection module 240 identifies multiple sets of groups form the group store 230 using various criteria, with each set including groups satisfying one or more criteria associated with the set. Example criteria associated with a set include: a location, a user, information describing additional social networking system users, types of connections between the user and additional users, or any other suitable information. For example, a set includes groups associated with a location specified by criteria associated with the set or a set includes groups including users having a specific type of connection to a user specified by criteria associated with the set. When selecting the groups, the group selection module 240 applies one or more rules specifying a minimum number of criteria associated with different sets. Alternatively, scores associated with a group may be modified based on criteria associated with a set including the group and criteria associated with sets including previously selected groups. For example, if a group is included in a set that also includes at least a threshold number of previously selected groups, the score of the group is decreased or a position of the group in a ranking is reduced. Alternatively, the group selection module 240 ranks candidate groups based on their associated scores and penalizes a ranking of a candidate group if it is included in a set that also includes another candidate group having a higher ranking than the group. As another example, the group selection module 240 generates different rankings for each set of groups, with a ranking for a set based on scores of groups included in the set. A threshold number of groups are selected from at least a threshold number of sets, based on the ranking for each set, to provide the user with different groups associated with different characteristics.

The web server 245 links the social networking system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the social networking system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Identifying Groups for Recommendation to a Social Networking System User

Figure 3:
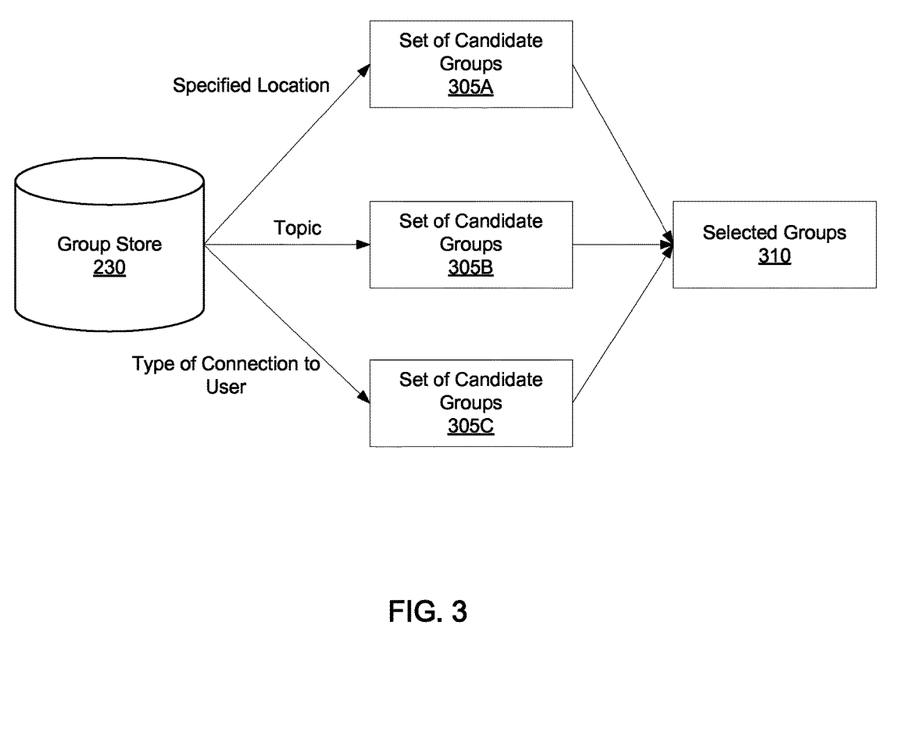
FIG. 3 is a process flow diagram of the social networking system identifying sets of candidate groups from stored groups, in accordance with an embodiment.

FIG. 3 is a process flow diagram of the social networking system 140 identifying sets of candidate groups. In the example shown by FIG. 3, the social networking system 140 identifies multiple sets of candidate groups from the group store 230, with each set of groups associated with one or more criteria. As shown in FIG. 3, set 305A of candidate groups includes groups associated with a specific location, set 305B of candidate groups includes groups associated with a specific topic, and set 305C of candidate groups includes groups associated with one or more users having a specific type of connection to the user. In different embodiments, any suitable criteria may be associated with a set of candidate groups, and any number of sets of candidate groups may be generated based on information from the group store 230. One or more selected groups 310 are determined from the sets 305A, 305B, 305C of candidate groups, as further described below. In the example of FIG. 3, the selected groups 310 include a group from each of set 305A, set 305B, and set 305C.

For example, the social networking system 140 ranks candidate groups, which are each included in one or more sets of groups, based on the scores associated with the candidate groups, while accounting for sets including different candidate groups. If a candidate group and an additional candidate group are both included in a common set, the ranking is modified to lower a position of the additional candidate group in the ranking relative to the candidate group. For example, a position of the additional candidate group in the ranking is lowered. In the example from FIG. 3, a ranking of group included in the set 305A of candidate groups is reduced if another group included in the set 305A of candidate groups has a higher position in the ranking. This reduces the likelihood of the selected groups 310 including a disproportionate number of sources associated with the specified location associated with the set 350A of candidate groups. Hence, a position in the ranking of a group is lowered if the group is included in the same group as another group having a higher position in the ranking. By penalizing a group included in a set that also includes another group with a higher position in the ranking, the social networking system 140 includes groups from a variety of sets of groups in the selected groups. Because different sets are associated with different criteria, different sets include groups having different characteristics, selecting groups included in different sets allows groups with a wider range of characteristics to be selected. In some embodiments, a threshold number of groups from a threshold number of sets are selected.

Figure 4:
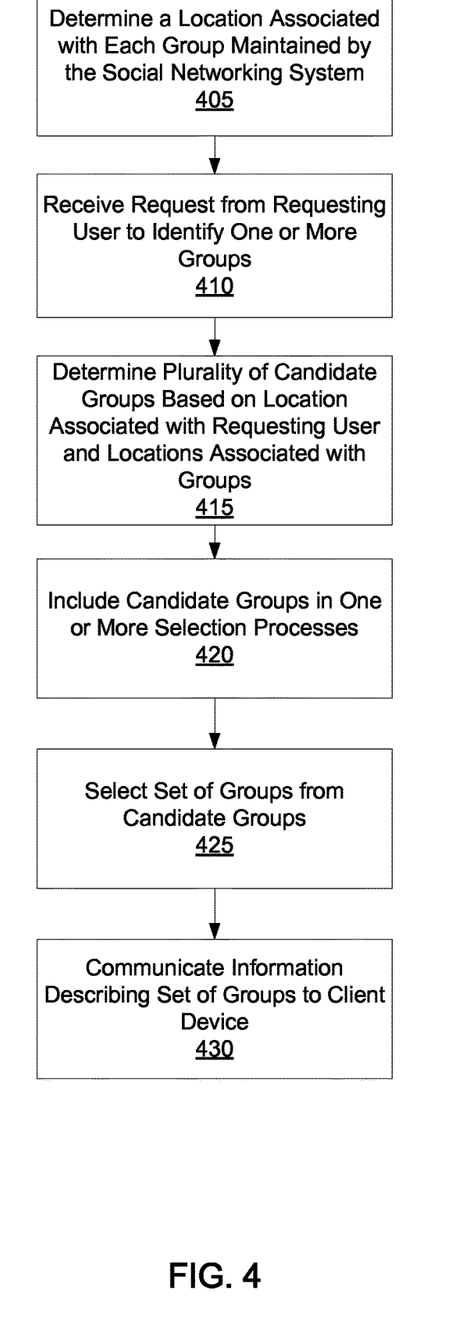
FIG. 4 is a flowchart of a method for identifying groups of users to a requesting user of a social networking system based on a location of the requesting user, in accordance with an embodiment.

FIG. 4 is a flowchart of one embodiment of a method for identifying groups of users to a requesting user of a social networking system 140 based at least in part on a location of the requesting user. In other embodiments, the method may include different and/or additional steps than those shown in FIG. 4. Additionally, steps of the method may be performed in different orders than the order described in conjunction with FIG. 4.

The social networking system 140 stores information identifying various groups of users. As described above in conjunction with FIG. 2, a group includes a plurality of users of the social networking system 140 and is associated with a group identifier uniquely identifying the group. One or more identifiers are associated with a group identifier to identify users of social networking system included in the group corresponding to the group identifier. Other information may be associated with a group identifier, such as a name identifying a group corresponding to the group identifier, a description associated with the group, descriptive information associated with the group (e.g., a location), topics associated with the group, a user that created the group, or other suitable information. As described above in conjunction with FIG. 2, one or more content identifiers specifying content items are associated with a group identifier to identify content items associated with a group associated with the group identifier. A group may be generated by a user of the social networking system 140 identifying users associated with the group or the social networking system 140 may generate one or more groups based on characteristics associated with users of the social networking system 140. Interactions associated with a group, such as interactions between various users and the group, are also stored by the social networking system 140 by associating the group identifier with a description of an interaction along with user identifiers of one or more users associated with the interaction.

Each user of the social networking system, including users in a group, is associated with a location. In some embodiments, a user specifies the location associated with the user to the social networking system 140, which stores the location in a user profile associated with the user. In some embodiments, the social networking system 140 associates different types of locations with a user, such as a hometown or other location specified by the user and a current location associated with the user. For example, the social networking system 140 periodically receives a location of a client device 110 associated with the user and stores the location of the client device 110 in association with the user, allowing the social networking system 140 to use the location of the client device 110 associated with the user as a proxy for the location of the user. In various embodiments, communication of the location of the client device 110 is subject to one or more privacy settings associated with the user, allowing the user to limit client device 110 communication of location information to the social networking system 140 or to prevent the client device 110 from communicating location information to the social networking system 140. Additionally, the social networking system 140 may maintain a limited amount of location information received from the client device 110 associated with the user to maintain the user's privacy. For example, the social networking system 140 stores a most recently received location from the client device 110 associated with the user and does not store a previously received location from the client device 110 associated with the user after receiving another, more recent, location from the client device 110 associated with the user. In some embodiments, the social networking system 140 prompts the user to authorize communication of a location of a client device 110 associated with the user to the social networking system 140 and storage of the location of the client device 110 associated with the user by the social networking system 140; hence, the user may explicitly opt-in to the social networking system 140 storing a location of the client device 110 associated with the user.

Additionally, the social networking system 140 may infer a location associated with the user based on content provided to the social networking system 140 by the user or actions performed by the user and communicated to the social networking system 140. For example, the social networking system 140 determines a location associated with a user as a location to which a user checked-in or as a location tagged by the user in content provided to the social networking system 140. In some embodiments, the social networking system 140 determines a location associated with the user as a location associated with certain actions performed by the user and logged by the social networking system 140 (e.g., check-ins) or as a location associated with certain content provided by the user to the social networking system 140.

Based on locations associated with users included in each group, the social networking system 140 determines 405 a location associated with each group. In one embodiment, the social networking system 140 identifies locations associated with various users in a group and determines 405 a location associated with the group based at least in part on a centroid of the locations associated with the various users in the group. For example, the social networking system 140 determines a centroid of the locations associated with each user in the group and determines a distance between locations associated with users in the group and the centroid. In one embodiment, the social networking system 140 generates a histogram of the distances between locations associated with users in the group and the centroid. If a specified percentile of the distances between locations associated with users in the group and the centroid is less than or equal to a threshold distance, the social networking system 140 determines 405 the location associated with the group as the centroid. Hence, if at least a threshold percentage of distances between the locations associated with users in the group and the centroid is less than or equal to the threshold distance from the centroid, the social networking system 140 determines 405 the centroid is the location associated with the group. For example, if at least 75% of distances between locations associated with users in the group are less than 7 miles from the centroid, the social networking system 140 determines 405 the centroid is the location associated with the group. In some embodiments, the social networking system 140 determines 405 the location associated with the group based on distances between locations associated with users in the group that are specified by the users (e.g., hometowns). Alternatively, the social networking system 140 determines 405 the location associated with the group based on locations associated with users in the group determined by the social networking system 140 from locations received from client devices 110 associated with the users or from other information associated with the users by the social networking system 140 (e.g., content provided to the social networking system 140 by the users, actions associated with the users by the social networking system 140).

The social networking system 140 receives 410 a request to identify one or more groups from a requesting user of the social networking system 140. For example, the request is a search query including one or more search terms compared to information associated with groups by the social networking system 140. Alternatively, the requesting user requests content for presentation by the social networking system 140. As another example, the social networking system 140 receives 410 a request from the requesting user to identify one or more groups with which the requesting user is not currently associated. The request includes information identifying the requesting user, such as a user identifier associated with the requesting user and may also include one or more characteristics of groups specified by the requesting user (e.g., location, topic, connection between the requesting user and users associated with the group).

Based at least in part on a location associated with the requesting user by the social networking system 140 and locations associated with groups, the social networking system 140 determines 415 a plurality of candidate groups from the groups maintained by the social networking system 140. In one example, the social networking system 140 maintains information various geographic regions, with each region including locations within a specified geographic area. For example, the social networking system 140 identifies geographic regions corresponding to rectangular regions including a specific area. As another example, the social networking system 140 identifies geographic regions corresponding to circular regions having a specified radius. The social networking system 140 associates an identifier of a geographic region including a location associated with the requesting user with the requesting user. Similarly, the social networking system 140 associates an identifier of a geographic region including a location associated with a group with the group. Alternatively, the social networking system 140 associates identifiers of groups associated with locations within a geographic region with an identifier of the geographic region and associates identifiers of users associated with locations within the geographic region with the identifier of the geographic region. The social networking system 140 identifies a geographic region including the location associated with the requesting user and determines 415 candidate groups as groups associated with locations within the geographic region including the location associated with the requesting user.

In some embodiments, the social networking system 140 determines 415 candidate groups as groups that satisfy at least a threshold number of criteria and are associated with locations within the geographic region including the location associated with the requesting user. For example, a candidate group is a group associated with a location within the geographic region including the location associated with the requesting user with less than a threshold percentage of users in the group identifying a common employer or identifying a common educational institution. As another example, the social networking system 140 determines 415 a candidate group as a group associated with a location within the geographic region including the location associated with the requesting user with less than a threshold percentage of users in the group where less than a threshold percentage of users have connections to each other indicating the users are family members. In another example, the social networking system 140 determines 415 a candidate group as a group associated with a location within the geographic region including the location associated with the requesting user with less than a threshold percentage of users in the group where less than a threshold percentage of users have connections to each other indicating the users have a specific relationship with each other (e.g., friends, co-workers). The social networking system 140 may apply any suitable criteria to groups when determining 415 candidate groups.

To more accurately determine 415 candidate groups, in some embodiments, the social networking system 140 modifies one or more dimensions of a geographic region including the location associated with the requesting user based on a density of groups associated with locations within an area of the geographic region. In one embodiment, the social networking system 140 determines a density of groups associated with locations within the geographic region as a ratio of a number of groups associated with locations within the geographic region to an area of the geographic region. If the density of groups associated with locations within the geographic region exceeds a threshold value, the social networking system 140 modifies one or more dimensions of the geographic region to reduce the area of the geographic region, so the modified geographic region has a lower density of groups associated with locations within the modified geographic region. For example, if the geographic region is a square region with dimensions of 0.1 degrees of latitude and 0.1 degrees of longitude that includes the location associated with the user and that has a density of groups associated with locations within the geographic region exceeding the threshold value, the social networking system 140 determines a modified geographic region as a square region with dimensions of 0.01 degrees of latitude and 0.01 degrees of longitude and that includes the location associated with the requesting user. The social networking system 140 then determines 415 candidate groups as groups associated with locations within the modified geographic region including the location associated with the requesting user, as further described above. In various embodiments, the amount of modification to one or more dimensions of the geographic region is based at least in part on a number of groups associated with locations within the geographic region or based at least in part on a density of groups associated with locations within the geographic region, allowing the social networking system 140 to more significantly modify one or more dimensions of geographic regions including larger number of groups. Further, in some embodiments, the social networking system 140 modifies one or more dimensions (e.g., reduces one or more dimensions) of the geographic region in response to a number of groups associated with locations within the geographic region exceeding a threshold number.

The social networking system 140 includes 420 the candidate groups in one or more selection processes, which may include additional candidate groups satisfying other criteria. In some embodiments, a selection process generates scores associated with each candidate group. A score associated with a candidate group provides a measure of a likelihood that the requesting user interacts with the candidate group. An interaction with the candidate group may be the requesting user joining the candidate group, the requesting user providing content to the candidate group, the requesting user accessing content associated with the candidate group, or the requesting user performing any other suitable interaction with the candidate group. In some embodiments, the score associated with the candidate group may represent a likelihood of the requesting user interacting with the candidate group within a time interval. To determine the likelihood of the requesting user interacting with the candidate group within the time interval, the social networking system 140 identifies characteristics associated with the candidate group (e.g., a topic associated with the group, a location associated with the group, etc.) and identifies one or more groups with which the requesting user previously interacted having characteristics matching, or similar to, the characteristics associated with the candidate group. Based on interactions where the requesting user accessed content associated with one or more of the identified groups and interactions where the user provided content to one or more of the identified groups, the social networking system 140 determines the likelihood of the requesting user interacting with the candidate group. For example, the social networking system 140 applies a model to the interactions where the requesting user accessed content associated with one or more of the identified groups and the interactions where the user provided content to one or more of the identified groups or joined one or more of the identified groups to determine a frequency with which the requesting user performs an interaction with the identified groups. The likelihood of the requesting user interacting with the candidate group during a time interval is based on the determined frequency, with the score for the candidate group based on the likelihood of the requesting user interacting with the candidate group. Generating a score associated with candidate groups is further described in U.S. patent application Ser. No. 14/535,265, filed on Nov. 6, 2014, and U.S. patent application Ser. No. 14/537,885, filed on Nov. 10, 2014, each of which is hereby incorporated by reference in its entirety.

Based on the one or more selection processes, the social networking system selects 425 a set of groups from the candidate groups. For example, the selection processes rank the candidate groups based on their associated scores, and may account for characteristics of the candidate groups, and selects 425 candidate groups having at least a threshold position in the ranking for the set of groups. Alternatively, the social networking system 140 selects 425 one or more candidate groups associated with at least a threshold score.

When selecting 425 the set of groups one or more groups, the social networking system 140 may also account for one or more characteristics of candidate groups, so the set includes groups having a variety of characteristics. For example, the social networking system 140 applies one or more rules to the candidate groups, with different rules specifying criteria based on different characteristics of candidate groups. In one embodiment, if a threshold number of candidate groups having a characteristic are selected 425 for the set, scores associated with other candidate groups having the characteristic are reduced, or positions of other candidate groups having the characteristic in the ranking of groups are reduced, to decrease the likelihood that additional candidate groups having the characteristic are selected 425 for the set. An amount by which the scores or positions of other candidate groups having the characteristic are decreased may be based on a number of candidate groups having the characteristic previously selected 425 for the set. Alternatively, scores or positions in the ranking associated with candidate groups that have not previously been selected 425 for the set, or that have not been selected 425 for the set within a threshold time interval, are increased.

In one embodiment, the selection processes applied by the social networking system 140 select 425 a threshold number of candidate groups having different characteristics based on one or more rules. For example, the social networking system 140 selects 425 a threshold number of candidate groups associated with maximum scores relative to other candidate groups having a specific characteristic and also selects a threshold number of additional candidate groups associated with maximum scores relative to other candidate groups having an additional characteristic. In another embodiment, the social networking system 140 generates different rankings associated with different characteristics, so a ranking includes candidate groups associated with a particular characteristic ranked based on their associated scores. Based on one or more rules, a threshold number of candidate groups are selected from at least a threshold number of rankings associated with different characteristics. Selecting candidate groups is further described in U.S. patent application Ser. No. 14/535,265, filed on Nov. 6, 2014, and U.S. patent application Ser. No. 14/537,885, filed on Nov. 10, 2014, each of which is hereby incorporated by reference in its entirety.

Information identifying the selected set of groups is communicated 430 from the social networking system 140 to a client device 110 associated with the requesting user that presents the information to the requesting user. For example, names associated with one or more of the groups in the set are communicated 430 to the client device 110. Additional information, such as one or more users connected to the requesting user and included in a group in the set of groups, a location associated with the group in the set of groups, or content associated with a group in the set of groups (e.g., an image associated with the group) may be communicated 430 to the client device 110 for presentation. The information communicated 430 to the client device 110 may also include an order associated with the set of groups. For example, groups in the set of groups are ordered based on their associated scores so they are presented by the client device 110 based on the order. In some embodiments, groups in the set of groups having higher scores have higher positions in the order. If the received request was a search query, the groups in the selected set of groups may be communicated to the client device 110 along with an order based on the scores associated with the groups in the set so the groups in the set are presented to the requesting user based on the order rather than an amount of similarity between topics, names, or other information associated with the selected groups and search terms in the search query. This allows information identifying groups in the set of groups to be presented based on a likelihood of the requesting user interacting with various groups in the set rather than similarity between characteristics of the groups in the set and search terms to increase the likelihood of the requesting user identifying a group with which the requesting user is likely to interact.

In some embodiments, the information communicated 430 to the client device 110 organizes the selected groups based on characteristics associated with the groups in the set of groups. For example, the set of groups includes multiple subsets of groups, with each subset associated with a characteristic and the information communicated 430 to the client device 110 identifies the subsets of groups. In one embodiment, a subset of groups includes groups associated with locations within a threshold distance of a location associated with the requesting user (e.g., a current location associated with the requesting user, a hometown associated with the requesting user). Selected groups having a characteristic are included in a subset associated with the characteristic. The client device 110 may present multiple pages or sections each associated with a subset and may present additional information associated with groups from the set included in a subset selected by the user. For example, a subset may include groups from the set associated with a particular location, groups from the set associated with at least a threshold number of additional users connected to the requesting user, groups from the set associated with a specific topic, or groups from the set associated with any suitable characteristic. Additionally, the requesting user may provide an input to the client device 110 to filter groups in the set of groups based on characteristics associated with the groups, allowing the requesting user to view groups having a specific characteristic or having a specific combination of characteristics from the set of groups.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    maintaining one or more groups at an online system, each group including one or more users of the online system, with each user associated with a location;
    determining a location associated with each of the one or more groups, the location associated with a group based at least in part on locations associated with users in the group, comprising:
        determining a centroid of the locations associated with users in the group;
        determining distances between locations associated with each user in the group and the centroid;
        generating a histogram of the determined distances; and
        determining the centroid as the location associated with the group in response to at least a threshold percentile of the determined distances from the histogram being less than or equal to a threshold distance;
    receiving a request from a requesting user of a social networking system to identify one or more groups maintained by the social networking system;
    determining a plurality of candidate groups for the requesting user from the one or more groups based at least in part on a distance between a location associated with the requesting user and locations associated with each of the one or more groups, a candidate group associated with a location within a threshold distance of the location associated with the user;
    including the plurality of candidate groups in one or more selection processes selecting a set of groups; and
    communicating information identifying the selected set of groups to a client device associated with the requesting user for presentation.

2. The method of claim 1, wherein the location associated with the group is based at least in part on hometowns associated with each user in the group and specified by the users.

3. The method of claim 1, wherein the location associated with the group is based at least in part on locations associated with each user in the group determined by the social networking system from locations received from client devices associated with users in the group.

4. The method of claim 1, wherein determining the plurality of candidate groups for the requesting user from the one or more groups based at least in part on the distance between the location associated with the requesting user and locations associated with each of the one or more groups comprises:
    identifying a geographic region including the location associated with the requesting user, the geographic region including locations within a specified geographic area; and
    determining the plurality of candidate groups as groups associated with locations included in the identified geographic region.

5. The method of claim 1, wherein determining the plurality of candidate groups for the requesting user from the one or more groups based at least in part on the distance between the location associated with the requesting user and locations associated with each of the one or more groups comprises:

identifying a geographic region including the location associated with the requesting user, the geographic region including locations within a specified geographic area; and identifying groups associated with locations included in the identified geographic region; and selecting identified groups satisfying at least a threshold number of criteria as candidate groups.

6. The method of claim 5, wherein one of the criteria specifies a threshold percentage of users in an identified group identifying a common employer and selecting identified groups satisfying at least the threshold number of criteria as candidate groups comprises:

selecting identified groups having less than the threshold percentage of users identifying the common employer.

7. The method of claim 5, wherein one of the criteria specifies a threshold percentage of users in an identified group having connections to each other indicating a specific relationship between the users and selecting identified groups satisfying at least the threshold number of criteria as candidate groups comprises:

selecting identified groups having less than the threshold percentage of users having connections to each other indicating the specific relationship between the users.

8. The method of claim 1, wherein determining the plurality of candidate groups for the requesting user from the one or more groups based at least in part on the distance between the location associated with the requesting user and locations associated with each of the one or more groups comprises:

identifying a geographic region including the location associated with the requesting user, the geographic region including locations within a specified geographic area; and identifying groups associated with locations included in the identified geographic region;

determining a density of groups associated with locations associated with the identified geographic region based at least in part on a number of the identified groups and an area of the geographic region;

generating a modified geographic region including the location associated with the requesting user by reducing one or more dimensions of the geographic region in response to the density of groups exceeding a threshold value; and identifying groups associated with locations within the modified geographic region as candidate groups.

9. The method of claim 1, wherein determining the plurality of candidate groups for the requesting user from the one or more groups based at least in part on the distance between the location associated with the requesting user and locations associated with each of the one or more groups comprises:

identifying a geographic region including the location associated with the requesting user, the geographic region including locations within a specified geographic area; and identifying groups associated with locations included in the identified geographic region;

determining a number of the identified groups;

generating a modified geographic region including the location associated with the requesting user by reducing one or more dimensions of the geographic region in response to number of identified groups exceeding a threshold value; and identifying groups associated with locations within the modified geographic region as candidate groups.

10. A computer program product comprising a non-transitory computer readable storage medium having instructions encoded thereon that, when executed by a processor, cause the processor to:

maintain one or more groups at an online system, each group including one or more users of the online system, with each user associated with a location;

determine a location associated with each of the one or more groups, the location associated with a group based at least in part on locations associated with users in the group, comprising:

determine a centroid of the locations associated with users in the group;

determine distances between locations associated with each user in the group and the centroid;

generate a histogram of the determined distances; and determine the centroid as the location associated with the group in response to at least a threshold percentile of the determined distances from the histogram being less than or equal to a threshold distance;

receive a request from a requesting user of a social networking system to identify one or more groups maintained by the social networking system;

determine a plurality of candidate groups for the requesting user from the one or more groups based at least in part on a distance between a location associated with the requesting user and locations associated with each of the one or more groups, a candidate group associated with a location within a threshold distance of the location associated with the user;

include the plurality of candidate groups in one or more selection processes selecting a set of groups; and communicate information identifying the selected set of groups to a client device associated with the requesting user for presentation.

11. The computer program product of claim 10, wherein the location associated with the group is based at least in part on hometowns associated with each user in the group and specified by the users.

12. The computer program product of claim 10, wherein the location associated with the group is based at least in part on locations associated with each user in the group determined by the social networking system from locations received from client devices associated with users in the group.

13. The computer program product of claim 10, wherein determining the plurality of candidate groups for the requesting user from the one or more groups based at least in part on the distance between the location associated with the requesting user and locations associated with each of the one or more groups comprises:

identify a geographic region including the location associated with the requesting user, the geographic region including locations within a specified geographic area; and determine the plurality of candidate groups as groups associated with locations included in the identified geographic region.

14. The computer program product of claim 10, wherein determining the plurality of candidate groups for the requesting user from the one or more groups based at least in part on the distance between the location associated with the requesting user and locations associated with each of the one or more groups comprises:

identify a geographic region including the location associated with the requesting user, the geographic region including locations within a specified geographic area; and identify groups associated with locations included in the identified geographic region; and select identified groups satisfying at least a threshold number of criteria as candidate groups.

15. The computer program product of claim 14, wherein one of the criteria specifies a threshold percentage of users in an identified group identifying a common employer and selecting identified groups satisfying at least the threshold number of criteria as candidate groups comprises:

select identified groups having less than the threshold percentage of users identifying the common employer.

16. The computer program product of claim 10, wherein determine the plurality of candidate groups for the requesting user from the one or more groups based at least in part on the distance between the location associated with the requesting user and locations associated with each of the one or more groups comprises:

identify a geographic region including the location associated with the requesting user, the geographic region including locations within a specified geographic area; and identify groups associated with locations included in the identified geographic region;

determine a density of groups associated with locations associated with the identified geographic region based at least in part on a number of the identified groups and an area of the geographic region;

generate a modified geographic region including the location associated with the requesting user by reducing one or more dimensions of the geographic region in response to the density of groups exceeding a threshold value; and identify groups associated with locations within the modified geographic region as candidate groups.

\* \* \* \* \*

UNITED STATES PATENT AND TRADEMARK OFFICE
CERTIFICATE OF CORRECTION

PATENT NO. : 9,900,392 B2  
APPLICATION NO. : 14/750509  
DATED : February 20, 2018  
INVENTOR(S) : Bradley Ray Green et al.

Page 1 of 1

It is certified that error appears in the above-identified patent and that said Letters Patent is hereby corrected as shown below:

In the Claims

Column 19, Line 64, after "response to" insert -- a --.

Signed and Sealed this
Seventh Day of August, 2018

Andrei Iancu
*Director of the United States Patent and Trademark Office*